US007593484B2

(12) United States Patent
Beamish et al.

(10) Patent No.: US 7,593,484 B2
(45) Date of Patent: Sep. 22, 2009

(54) RADIO FREQUENCY (RF) RECEIVER WITH DOUBLE LOOP INTEGRATED FAST RESPONSE AUTOMATIC GAIN CONTROL (AGC)

(75) Inventors: Norman J. Beamish, Killiney (IE); William J. Domino, Yorba Linda, CA (US); Morten Damgaard, Laguna Hills, CA (US); Bala Ramachandran, Palo Alto, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 644 days.

(21) Appl. No.: 11/241,428

(22) Filed: Sep. 30, 2005

(65) Prior Publication Data

US 2007/0076827 A1   Apr. 5, 2007

(51) Int. Cl.
*H04L 25/06* (2006.01)
*H04L 25/49* (2006.01)
*H03F 3/45* (2006.01)

(52) U.S. Cl. .................. 375/318; 375/297; 375/296; 327/50; 327/52; 330/252; 330/85; 330/96

(58) Field of Classification Search .................
375/240.26–240.29, 254, 285, 296, 311–312, 375/344–351, 226, 240.27, 240.28, 278, 375/297, 300, 318, 317, 320; 327/50–58, 327/141, 306, 560–563; 330/252, 2, 85, 330/96, 134–135; 714/798–799
See application file for complete search history.

(56) References Cited

U.S. PATENT DOCUMENTS

| 4,517,586 | A  | * | 5/1985 | Balaban et al. | 348/572 |
| 5,416,759 | A  | * | 5/1995 | Chun | 369/44.36 |
| 7,065,133 | B1 | * | 6/2006 | Phanse et al. | 375/219 |
| 7,426,376 | B2 | * | 9/2008 | Srinivasan et al. | 455/252.1 |
| 2003/0078007 | A1 | * | 4/2003 | Parssinen et al. | 455/67.1 |
| 2003/0124999 | A1 | * | 7/2003 | Parssinen et al. | 455/226.1 |
| 2004/0043745 | A1 | * | 3/2004 | Najarian et al. | 455/334 |
| 2005/0025001 | A1 | * | 2/2005 | Takaba | 369/44.36 |
| 2005/0130615 | A1 | * | 6/2005 | Darabi | 455/232.1 |

* cited by examiner

*Primary Examiner*—David C Payne
*Assistant Examiner*—Linda Wong

(57) ABSTRACT

A radio frequency (RF) receiver device comprises a receiver system that receives an analog radio frequency signal and downconverts the analog radio frequency signal to a downconverted analog signal, the receiver system further including a peak signal detector configured to determine a peak signal level of the downconverted analog signal, and an automatic gain control adjustment element configured to determine whether the peak signal level falls within a predetermined range, and configured to generate, in the RF receiver, a gain control signal controlling the gain of at least one analog component based on whether the peak signal level falls within the predetermined range.

13 Claims, 3 Drawing Sheets

RADIO FREQUENCY (RF) RECEIVER WITH DOUBLE LOOP INTEGRATED FAST RESPONSE AUTOMATIC GAIN CONTROL (AGC)

BACKGROUND

Simple textbook models of radio receivers typically use homodyne detection. Homodyne detection involves directly demodulating a radio frequency (RF) signal to baseband in a single operation. A receiver that implements homodyne detection is commonly referred to as a direct conversion receiver (DCR). Current state of the art radio receivers for Global System for Mobile Communication/Enhanced Data Rates for GSM Evolution (GSM/EDGE) use DCR systems to obtain cost reductions compared to heterodyne systems.

An emerging trend in the industry is the move toward an all-digital interface between the radio frequency (RF) section of a transceiver and the baseband processing section of the transceiver. For the receiver in particular, there is also a trend toward implementing the signal filtering in the digital domain with a minimal amount of analog processing prior to the analog-to-digital converter (ADC). This requires the ADC to provide wide dynamic range to pass out-of-band signals. To this end, it is desirable to minimize the interaction between the RF section and the baseband processing section of the receiver. Ideally, the baseband processing section would communicate only time and channel information to the RF section, and the RF section would deliver demodulated and decoded digital data to the baseband processing section.

In current transceivers, one of the reasons for non-digital interaction between the RF section and the baseband processing section is to generate what is referred to as an automatic gain control signal for certain RF receiver components. Typically, a received signal is analyzed to determine the amount of energy in the signal. An automatic gain control (AGC) circuit is generally driven by an estimate of the energy in the received signal. This typically requires that the receiver make a determination of the amount of energy in the desired signal and adjust the gain of the adjustable receiver components so that the mean signal strength remains at an approximate target value. The baseband processing section typically generates what is referred to as a received signal strength indicator (RSSI) signal. Information relating to the strength of the received signal is then communicated back to the RF section so that adjustments to components in the receiver can be made.

Unfortunately, this approach has deficiencies. The energy in the desired signal must be estimated. As the desired signal at the antenna input also contains signals at other frequencies, it is necessary to first remove these "out-of-band" signals using costly and inefficient filters. This filtering also adds a processing delay. Then, to determine the energy in the signal, a sum of squares calculation is typically performed on the desired signal, consuming processing resources.

In addition, the energy estimate is often filtered by a low-pass filter to determine the mean level of the desired signal over a time interval, thus introducing an additional delay. Further, a separate controller is often used to perform the energy filtering and to subsequently determine the appropriate receiver gain setting. Transferring data to and from the controller adds yet additional delay. The impact of the combined delay prevents the AGC circuitry from quickly responding to changes in the level of the received signal.

Finally, because the energy estimate is calculated after the received signal has been filtered, the AGC circuitry cannot compensate for changes in the level of out-of-band signals that accompany the desired signal. This necessitates that the receiver be designed with sufficient dynamic range to accommodate a wide range of out-of-band energy levels or to have sufficient filtering to remove out-of-band signals early in the receiver chain.

Thus, it would be desirable to minimize the non-digital interaction between an RF section and a baseband processing section of a transceiver.

SUMMARY

In an embodiment, among others, a method for operating a receiver is disclosed that comprises receiving an analog radio frequency signal, the analog radio frequency signal occurring during a defined time period, downconverting the analog radio frequency signal to a downconverted analog signal, determining, in an RF portion of the receiver, a peak signal level of the downconverted analog signal, determining whether the peak signal level falls within a predetermined range, and generating a gain control setting for at least one analog component based on whether the peak signal level falls within the predetermined range.

In another embodiment, a radio frequency (RF) receiver device comprises a receiver system that receives an analog radio frequency signal and downconverts the analog radio frequency signal to a downconverted analog signal, a peak signal detector configured to determine a peak signal level of the downconverted analog signal, and an automatic gain control adjustment element configured to determine whether the peak signal level falls within a predetermined range, and configured to generate, in the RF receiver system, a gain control signal based on whether the peak signal level falls within the predetermined range.

Related systems and methods of operation are also provided. Other systems, methods, features, and advantages of the invention will be or become apparent to one with skill in the art upon examination of the following figures and detailed description. It is intended that all such additional systems, methods, and features, and advantages be included within this description and be within the scope of the disclosure.

BRIEF DESCRIPTION OF THE FIGURES

Many aspects of an RF receiver with double loop integrated fast response AGC can be better understood with reference to the following drawings. The components in the drawings are not necessarily to scale, emphasis instead being placed upon clearly illustrating the principles described herein. Moreover, in the drawings, like reference numerals designate corresponding parts throughout the several views.

DETAILED DESCRIPTION

Embodiments of an RF receiver with double loop integrated fast response automatic gain control (AGC) are disclosed. In one embodiment, an RF receiver with double loop integrated fast response AGC performs substantially all receiver gain control estimation and compensation processing in the RF portion of a transceiver and provides a digital signal to the baseband processing section of a transceiver. However, embodiments of an RF receiver with double loop integrated fast response AGC can be implemented in transceivers different from the transceiver disclosed herein. For example, an RF receiver with double loop integrated fast response AGC can be implemented as a direct conversion receiver, a low intermediate frequency (IF) receiver, or a receiver that implements an intermediate frequency.

The RF receiver with double loop integrated fast response AGC generates an AGC signal within the RF section of the receiver and presents an all-digital interface to a baseband processing section of the transceiver, thus minimizing non-digital communications between the RF section and the baseband processing section of a transceiver. Further, as will be described below, the RF receiver with double loop integrated fast response AGC allows energy from interfering signals to be considered in the AGC calculation, thus relaxing the dynamic range and filtering requirements of the receiver.

Although described with particular reference to a portable transceiver, embodiments of the RF receiver with double loop integrated fast response AGC can be implemented in practically any transceiver system that receives information modulated on a carrier signal. Also, embodiments of the RF receiver with double loop integrated fast response AGC make feasible less expensive radio designs that reduce the effect of poor RF performance characteristics by allowing the dynamic compensation of these characteristics in the digital domain and in real-time on a burst-by-burst basis. The description and figures that follow will be used to illustrate an example implementation for embodiments of an RF receiver with double loop integrated fast response AGC.

Figure 1:
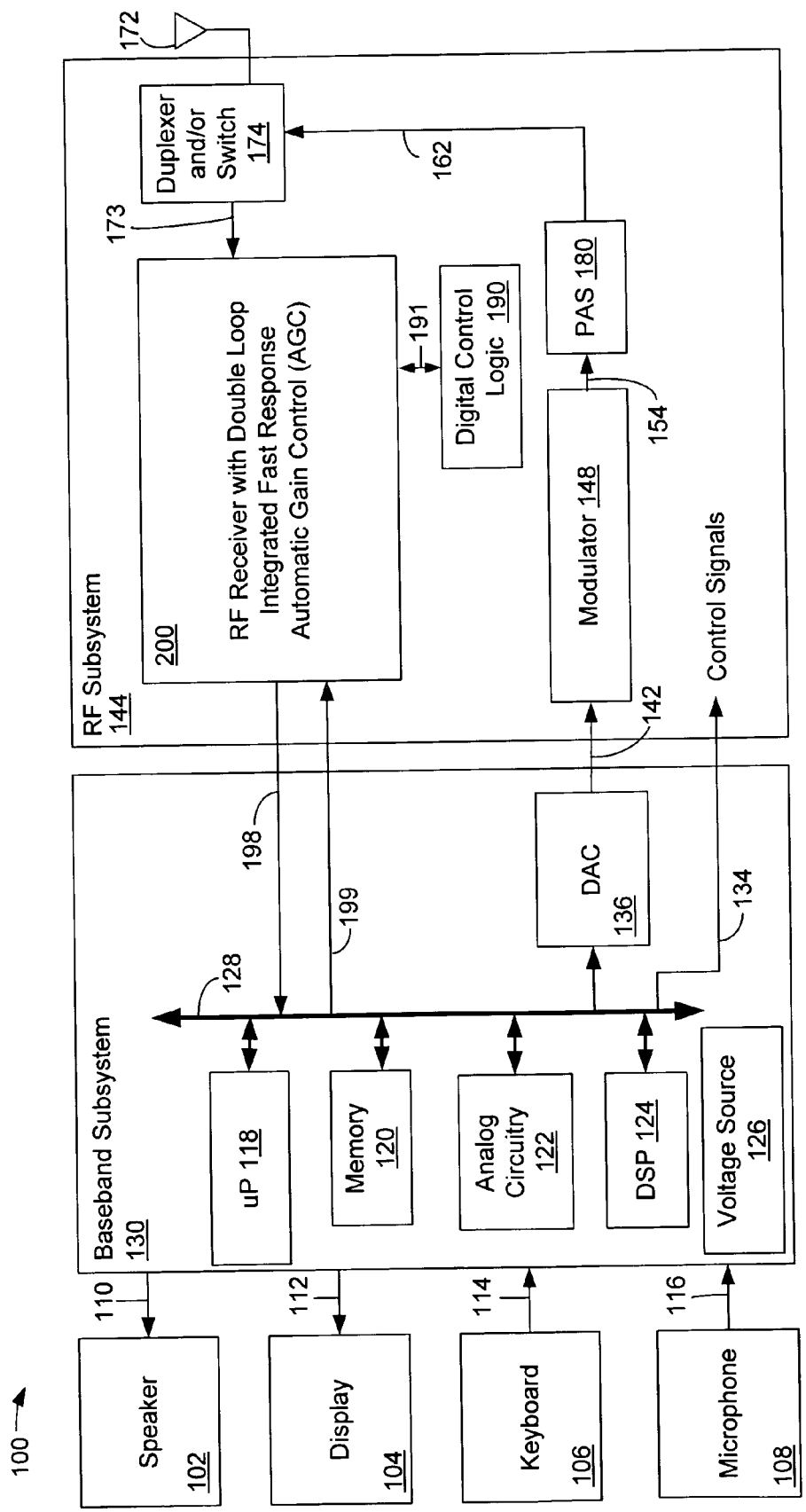
FIG. 1 is a block diagram of an example portable transceiver in which embodiments of an RF receiver with double loop integrated fast response AGC can be implemented.

FIG. 1 is a block diagram illustrating an example portable transceiver 100 in which various embodiments of an RF receiver with double loop integrated fast response AGC can be implemented. The portable transceiver 100 includes a speaker 102, display 104, keyboard 106, and microphone 108, all connected to a baseband subsystem 130. In an embodiment, the portable transceiver 100 can be, for example, a portable telecommunication device such as a mobile/cellular-type telephone. The speaker 102 and display 104 receive signals from the baseband subsystem 130 via connections 110 and 112, respectively. Similarly, the keyboard 106 and microphone 108 supply signals to the baseband subsystem 130 via connections 114 and 116, respectively.

The baseband subsystem 130 includes a microprocessor (μP) 118, memory 120, analog circuitry 122, and a digital signal processor (DSP) 124 in communication via bus 128. The baseband subsystem 130 also includes, in an embodiment, a voltage source 126. Bus 128, although shown as a single bus, may be implemented using multiple busses connected as necessary among the subsystems within the baseband subsystem 130. The microprocessor 118 and memory 120 provide signal timing, processing and storage functions for the portable transceiver 100. Analog circuitry 122 provides analog processing functions for the signals within the baseband subsystem 130. The baseband subsystem 130 provides control signals to the RF subsystem 144 via connection 134, and/or over connection 199 via a serial bus interface (not shown) included within the RF subsystem 144. Although each of connections 134 and connection 199 are shown as a single connection, the control signals may originate from the DSP 124 and/or from the microprocessor 118, and are supplied to a variety of points within the RF subsystem 144. It should be noted that, for brevity, only the basic components of the portable transceiver 100 are illustrated herein.

The baseband subsystem 130 also includes, in an embodiment, a digital-to-analog converter (DAC) 136. The DAC 136 also communicates with the microprocessor 118, memory 120, analog circuitry 122, and/or DSP 124 via bus 128. The DAC 136 converts the digital communication information within the baseband subsystem 130 into an analog signal for transmission to the RF subsystem 144 via connection 142.

The analog signal on connection 142 is modulated and upconverted by a modulator 148. In some embodiments, a digital modulator can be located in the RF subsystem 144 wherein the signal from the baseband to the RF subsystem 144 is digital. A modulated signal from the modulator 148 is provided over connection 154. A power amplifier system (PAS) 180 amplifies the modulated signal(s) on connection 154 to the appropriate power level for transmission via connection 162 to a duplexer and/or switch module 174. The transmit signal energy is provided from the duplexer and/or switch module 174 to an antenna 172.

Signals are received at the antenna 172, provided to the duplexer and/or switch module 174, and routed to one of several signal-processing paths of the RF receiver with double loop integrated fast response AGC 200 via connection 173. It will be understood by one having ordinary skill in the art that full-duplex transmit/receive is accomplished, in one implementation, through the use of the duplexer and/or switch module 174 wherein the duplexer and/or switch module 174 includes a duplexer. Alternatively, in another implementation, half-duplex transmit/receive is accomplished through the use of a transceiver duplexer and/or switch module 174 wherein the duplexer and/or switch module 174 includes a switch. The duplexer and/or switch module 174 can also provide band separation, where in one implementation, the duplexer and/or switch module 174 will typically route one set of receive bands to a first receive port (not shown), and a second set of receive bands to a second receive port (not shown). Likewise, the duplexer and/or switch module 174 will typically route one set of transmit bands to a first transmit port (not shown), and a second set of transmit bands to a second transmit port (not shown). In an embodiment, the operation of the duplexer and/or switch module 174 is controlled by a control signal from the baseband subsystem 130 (e.g., via connection 134). In some embodiments, a switch (e.g., controlled from the baseband subsystem 130 via connection 134) can be used to route received signals to the RF receiver with double loop integrated fast response AGC 200 or transmit signals from connection 162 to the antenna 172.

Signals received by the antenna 172 can, at the appropriate time determined by the baseband subsystem 130, be directed via the duplexer and/or switch module 174 to the RF receiver with double loop integrated fast response AGC 200 via connection 173. The RF receiver with double loop integrated fast response AGC 200 includes, in an embodiment, functionality for estimating and calculating an automatic gain control signal with which to control the gain setting of components within the receiver. In this embodiment in accordance with the invention, the automatic gain control signal is a digital signal, but it may be an analog or digital control signal. The AGC functionality occurs in the RF portion of the receiver and generates a control signal with which to control the gain of various elements in the receive chain. The AGC processing is performed in real time on a per receive interval basis. A per receive interval basis can be a burst-by-burst interval in a time division multiple access (TDMA) communication methodology. The RF receiver with double loop integrated fast response AGC 200 also includes circuitry to convert the analog received signal to a digital signal, thereby presenting an all-digital interface to the baseband subsystem 130.

The RF receiver with double loop integrated fast response AGC 200 communicates via connection 191 with a digital control logic 190 to control the various digital processing functions that occur within the RF receiver with double loop integrated fast response AGC 200, and can also include other components used for receiving and processing signals for the various modes and systems, as would be understood by one having ordinary skill in the art. In an embodiment, the digital control logic 190 is a generic representation of a source of control information for various elements to be described below. Note that in some embodiments, one or more of the disclosed functions of the RF receiver with double loop integrated fast response AGC 200 can be implemented in the microprocessor 118, or in other components of the portable transceiver 100 including the DSP 124 or memory 120. Further, one or more components of the RF receiver with double loop integrated fast response AGC 200 can be implemented using hardware, software, and/or a combination of hardware and software. The RF receiver with double loop integrated fast response AGC 200 provides digital output signals over connection 198 to the bus 128 for further processing in the digital domain. By performing AGC processing in the RF receiver with double loop integrated fast response AGC 200 in the digital domain, the communication of analog AGC signals between the RF subsystem 144 and the baseband subsystem 130 may be minimized.

Figure 2:
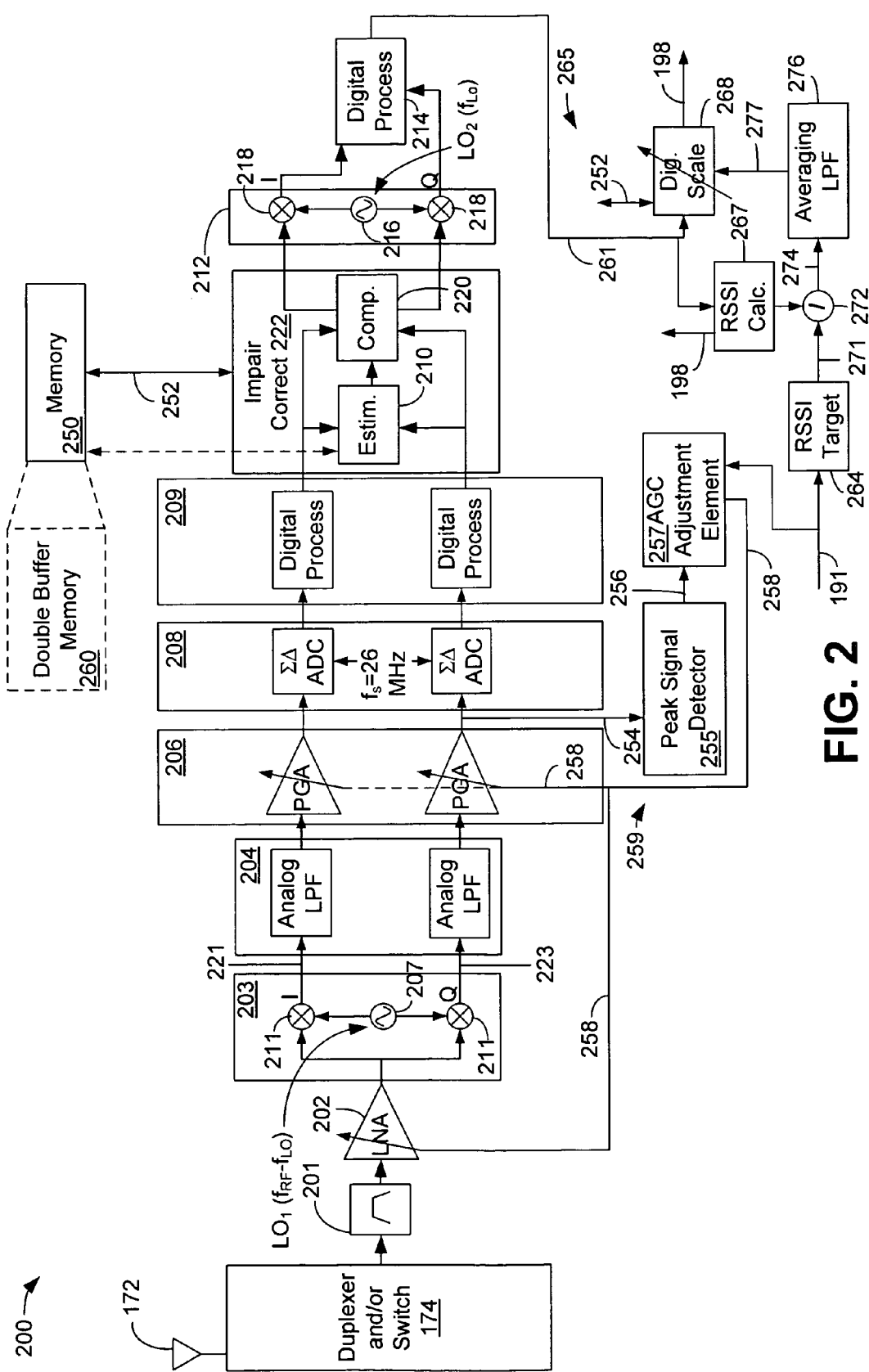
FIG. 2 is a block diagram of an embodiment of an RF receiver with double loop integrated fast response AGC shown in FIG. 1.

FIG. 2 is a block diagram of an embodiment of an RF receiver with double loop integrated fast response AGC 200 implemented in the portable transceiver 100 shown in FIG. 1. The RF receiver with double loop integrated fast response AGC 200 includes RF, analog, and digital components and is sometimes referred to as a "mixed signal device" or MSD. In an embodiment, a signal received by the antenna 172 will be directed to a receive filter 201, which filters the received signal and supplies the filtered signal to a low noise amplifier LNA 202. The receive filter 201 is a band pass filter, which passes all channels of the particular cellular system in which the portable transceiver 100 is operating. As an example, for a 900 Megahertz (MHz) GSM (Global System for Mobile Communication) system, the receive filter 201 passes all frequencies from approximately 925 MHz to 960 MHz, covering 175 channels of 200 kilohertz (kHz) each. One purpose of this filter 201 is to reject all frequencies outside the desired region.

The LNA 202 is an analog element that amplifies the signal received from the receive filter 201 to a level at which a downconverter 203 can translate the signal from the transmitted frequency to an intermediate frequency. As will be described below, a control input of the LNA 202 is coupled to connection 258, over which is supplied a gain adjustment signal from an AGC adjustment element 257.

The downconverter 203 includes a mixer 211 and a local oscillator (or LO) 207 that generates a local oscillator signal ($LO_1$ signal) having a frequency that is a function of the frequency of the desired RF receive signal and the frequency of the desired low IF. The $LO_1$ signal is used to downconvert the signal received from the LNA 202. The downconverted signal has a frequency that can be centered at an intermediate frequency of approximately 135.417 kHz, versus 100 kHz as used in conventional systems. One benefit (for example, in a system configured for enhanced data rates for GSM evolution (EDGE) operation) of having the intermediate frequency at approximately 135.417 kHz is that signal degradation that occurs when attempting to remove DC offset is mitigated or avoided altogether since DC offset is out-of band when an intermediate frequency of approximately 135.417 kHz is implemented, as opposed to being in-band when 100 kHz is the intermediate frequency. Additional benefits of operating at an intermediate frequency of 135.417 kHz will be described below.

The IF signals output from the downconverter 203 include an in-phase (I) signal on connection 221 and a quadrature-phase (Q) signal on connection 223. These signals are provided to a low-pass filter 204, which provides adjacent channel rejection and anti-aliasing functionality. The anti-aliasing functionality attenuates signals that lie outside the fundamental Nyquist band. A gain imbalance exists when the composite gain (e.g., from the mixer 211 of downconverter 203 to baseband) of the I channel (i.e., the I signal on connection 221) is not equal to that of the Q channel (i.e., the Q signal on connection 223). A phase imbalance exists when there is not exactly 90-degrees phase separation between the I and Q channels. The adjacent channel rejection and anti-aliasing functionality ensures that a downstream sigma-delta analog-to-digital converter (ADC) 208 will not saturate or overload when large interferers are present. The resulting filtered signals output from the low-pass filter 204 are amplified by a programmable gain amplifier (PGA) 206. The PGA 206 is an analog device that amplifies the filtered signal and supplies the amplified signal to the sigma-delta ADC 208. As with the LNA 202, the PGAs 206 each include a control input coupled to connection 258, over which is supplied a gain adjustment signal from an AGC adjustment element 257.

In accordance with an embodiment of the RF receiver with double loop integrated fast response AGC 200, the output of the PGA 206 is directed via connection 254 to a peak signal detector 255. Note that the output of each of the PGAs 206 is directed to the peak signal detector 255 to account for both the in-phase (I) and quadrature-phase (Q) of the signal. However, only one signal path is shown for clarity. The peak signal detector 255 can be implemented as, for example, a peak-peak hold detector that determines the peak amplitude signal levels of the output of the PGAs 206 on a burst-by-burst basis. The peak signal detector 255 supplies burst peak amplitude values via connection 256 to an AGC adjustment element 257. The AGC adjustment element 257, the operation of which will be described below in detail, receives a control signal from the digital control logic 190 and compares the amplitude level of the signal on connection 256 with a range of acceptable values and supplies a gain adjustment signal to the LNA 202 and to the PGA 206 via connection 258.

The peak signal detector 255 and the AGC adjustment element 257 can be implemented in software, hardware, or a combination of software and hardware. In one embodiment, the functionality of portions of the peak signal detector 255 and the AGC adjustment element 257 are performed in conjunction with one or more memory elements that are accessible to the peak signal detector 255 and the AGC adjustment element 257 via, for example, one or more high speed internal busses. Further, the peak signal detector 255 and the AGC adjustment element 257 may be implemented without external memory in what is referred to as a "streaming arrangement" whereby data is passed through the peak signal detector 255 and the AGC adjustment element 257 at the system data rate. The peak signal detector 255 and the AGC adjustment element 257 form an analog AGC control loop 259 that adjusts the analog gain values of the LNA 202 and the PGA 206 based on measurements made on the received signal prior to conversion to the digital domain.

In an embodiment, the maximum peak-to-peak amplitude deviation of the signal on connection 254 at the input to the sigma-delta ADC 208 over a specified time interval (for example, one TDMA burst) is recorded. The AGC adjustment element 257 continuously compares the peak-to-peak amplitude deviation of the in-phase (I) and quadrature-phase (Q) portions of the signal against a range of acceptable values. If the measured peak-to-peak value falls below the minimum of the range, the gain state of the analog LNA 202 and/or the analog PGA 206 is adjusted upward. If the measured peak-to-peak value rises above the maximum of the range, the gain state of the analog LNA 202 and/or the analog PGA 206 is adjusted downward. If the measured peak-to-peak value lies within the acceptable range, the gain state of the analog LNA 202 and/or the analog PGA 206 is not adjusted. In an embodiment, the measurement of the maximum peak-to-peak amplitude deviation is done within a specified time interval (for example, one TDMA burst), then any AGC adjustment performed as a result is applied at a later time interval (for example the next TDMA burst). In another embodiment, the AGC adjustment may be performed immediately upon completion of the peak-to-peak amplitude deviation measurement, allowing correction of the gain in communication systems that may not employ a "burst" type communication methodology.

This AGC adjustment arrangement allows the gain state of the adjustable receiver components to be driven by the signal at the input to the ADC, thereby minimizing the possibility that the sigma-delta ADC 208 will overload or saturate and catastrophically fail. The sigma-delta ADC 208 is subject to hard failure if overloaded or saturated. The other components in the receiver chain tend to fail "softly" if overloaded or saturated. By observing the peak-to-peak amplitude deviation at the input to the sigma-delta ADC 208 on connection 254, and by performing AGC calculations in the RF subsystem 144, rapid AGC correction can be implemented that reacts directly to the signal at the input of the sigma-delta ADC 208 and that rapidly compensates for signal amplitude deviations within a single burst interval. Further, by using the AGC adjustment arrangement described herein, and because blocking signals have not yet been removed by filtering, the signal on connection 254 contains blocker energy and can be compensated by the AGC adjustment element 257, thus providing rapid and accurate AGC adjustment.

Further, the circuitry within the peak signal detector 255 and the AGC adjustment element 257 is simple to implement and the gain state of the analog receiver components can be adjusted within a maximum delay of one burst interval.

The output of the PGA 206 is supplied to the sigma-delta ADC 208. The sigma-delta ADC 208 preferably provides a sufficiently wide bandwidth (i.e., it operates using a sufficiently high sample rate) whereby aliased images of adjacent channel interferers are sufficiently attenuated before they fold back into the desired band when the signal is downsampled. In some embodiments, the sigma-delta ADC 208 may incorporate automatic saturation detection functionality. In one embodiment, the sigma-delta ADC 208 samples the signal at 26 MHz to ensure that adjacent channel interferers do not alias into the desired signal band, while minimizing the performance requirements of the analog LPF 204. The resulting digital signals are provided to a digital processing block 209.

The digital processing block 209 may include integrating functionality to provide attenuation of adjacent channel interferers. For example, the use of a higher order integrator (e.g., $4^{th}$ order) may be used for greater interferer rejection. The digital processing block 209 may also include functionality for differentiation, downsampling, anti-droop (e.g., equalization and compensation to reduce the asymmetry of the amplitude response across the desired signal bandwidth), and DC removal (e.g., implemented using a notch filter), among other processing components as would be understood in the context of this disclosure by one having ordinary skill in the art. In one embodiment, the sample rate of the downsampled signal is approximately 1.08 MHz or $\frac{1}{24}^{th}$ of the ADC sampling frequency.

The signal is provided from the digital processing block 209 to an impairment correction module 222. The impairment correction module 222 can be implemented in software, hardware, or a combination of software and hardware. In an embodiment, the functionality of portions of the impairment correction module 222 are performed in conjunction with one or more memory elements that are accessible to the impairment correction module 222 via, for example, one or more high speed internal busses. The impairment correction module 222 includes an estimator module 210 and a compensator module 220. While shown as residing within the impairment correction module 222, the functionality provided by the estimator module 210 and the compensator module 220 may be performed in conjunction with other components of the portable transceiver 100. The estimator module 210 operates on the I and Q signals together as the estimator module 210 attempts to determine the relationship between the I and Q statistics of the received signal. The compensator module 220 receives the data generated by the estimator module 210 and applies the estimate data to the I and Q signals to compensate for receiver impairments. Since the I and Q signals are complex signals, the compensation is thus implemented as a complex operation applied to the complex signals.

The estimator module 210 estimates impairments by monitoring the signal at one burst, and then implementing a correction or compensation at the compensator module 220 in the same burst. In this manner, a real-time receiver impairment estimation and correction can be applied to the received data. Such a real-time receiver impairment correction is particularly useful in radio systems having channel parameters that rapidly change from receive interval to receive interval. For example, such an estimation and correction system is useful in frequency hopping communication systems where channel parameters are likely to change from burst to burst. An example is a frequency hopping communication scheme in which one burst is located at the upper portion of the GSM frequency plan with a following burst of data occurring at the lower portion of the GSM frequency plan. The ability to estimate and compensate for receiver impairments on each burst makes systems that use frequency hopping and that employ the methodology described herein significantly more robust than communication schemes that use estimation and compensation methodologies that estimate receiver impairments on one burst and apply the correction to a subsequent burst.

In practice, the estimator module 210 communicates over high speed internal data bus 252 with a memory element 250 to buffer the receive data for a particular receive time interval, or burst, at the same speed or faster than the speed at which the data is being processed. The data bus 252 operates at least at the speed that the data is traveling through the RF receiver with double loop integrated fast response AGC 200 and preferably, in this embodiment, at least at 1.08 MHz. The estimator module 210 estimates parameters of the signal to monitor for impairments such as DC offset, gain imbalance and phase imbalance. The complexity of this task depends, at least in part, on the stability of the DC offset and the gain and phase imbalance over frequency and time. If the DC offset and the gain and phase imbalance vary significantly from channel to channel, it may be desirable to track the DC offset and the gain and phase imbalance separately for each channel. If the imbalances vary significantly over a short period of time (e.g., less than 5-10 seconds), then multiple burst averaging may be confined to shorter periods. Changes in temperature may also be considered in estimation and compensation, as well as other variations that may occur over time. In some embodiments, non-volatile random access memory (NVRAM) (not shown) may be used to store information about the DC offset and the gain and phase imbalance characteristics of the transceiver. Details of the operation of the impairment correction module 222 are omitted for brevity.

The receive data for each transmit interval is buffered in the memory 250 while the estimator module 210 calculates the receiver impairments for the data associated with that burst. The connection between the estimator module 210 and the memory 250 is also shown using a dotted line to indicate the interaction between these elements during the receiver impairment estimation. The speed of the internal data bus 252 allows the data to be buffered and the receiver impairments calculated on a near real-time basis and the receiver impairment estimate to be delivered to the compensation module 220 so that a compensation factor can be applied to the same data in the same receive interval that was used to compute the impairment estimation.

In another embodiment, the memory 250 can be configured in what is referred to as a "double buffer" configuration to allow the near real-time estimation and correction of received data in communication systems that may not employ a "burst" type communication methodology. Using such a double buffer memory 260 arrangement allows the impairment correction module 222 to estimate and compensate for receiver impairments over a continuous stream of data.

Once the nature of the impairment has been determined, the estimator module 210 delivers the DC offset and the gain and phase imbalance estimates to the analog and/or digital compensators (not shown) of the compensator module 220. Analog and digital compensators are well known in the art and thus discussion of the compensators is omitted. The compensator module 220 compensates for the impairments on the same burst that was used to determine the receiver impairments. In some applications, impairments remain fairly constant from burst to burst since the impairments are directly related to the characteristics of the associated receiver system. However, in other communication systems, impairments can vary significantly from burst to burst, making it desirable to have the capability to estimate the receiver impairments and compensate those impairments on the same data that was used to generate the estimate.

The signal from the impairment correction module 222 is provided to a digital demodulator 212. The digital demodulator 212 implements digital domain demodulation. The digital demodulator 212 includes a local oscillator 216 and a mixer 218. The mixer 218 mixes the IF signal with an $LO_2$ signal generated by the local oscillator 216 to translate the center frequency of the IF signal from approximately 135.417 kHz to 0 Hz, thus enabling the signal to pass to the baseband subsystem 130 (FIG. 1) for further processing.

Note that one benefit of using approximately 135.417 kHz as the intermediate frequency (e.g., as opposed to 100 kHz prevalent in conventional systems) is that 135.417 kHz is exactly $\frac{1}{8}^{th}$ of the frequency of the downsampled signal in the digital processor block 209 (i.e., (26 MHz/24)/8=135.417 kHz). In other words, the low intermediate frequency of 135.417 kHz is an integer divisor of the sampling rate of the input signal to the mixer 218, as shown in equation 1:

$$f_s = 1.083333 \text{ MHz, low } IF = f_s/8, (135.417 \text{ kHz});$$  Eq. 1

Further, for GSM/EDGE systems, 135.417 kHz is one-half the GSM/EDGE symbol rate. Thus, using approximately 135.417 kHz as the intermediate frequency simplifies the digital demodulation hardware.

The translation from approximately 135.417 kHz to baseband is a reordering of the complex signal accompanied by a scaling multiplier and two additions for every second input sample, due to the relationship between the symbol rate and the low intermediate frequency. Thus, the values the $LO_2$ signal takes are a repeating complex sequence, which are multiplied with the incoming signal (from impairment correction module 222). Table 1 shows exemplary values the $LO_2$ signal will take and the output generated with input signal (I,Q).

TABLE 1

| Sample Number (modulo 8) | Low IF | Output | scaling |
|---|---|---|---|
| 0 | 1 | $I + j \cdot Q$ | 1 |
| 1 | $1 + j$ | $(I - Q) + j \cdot (I + Q)$ | $1/\sqrt{2}$ |
| 2 | $j$ | $-Q + j \cdot I$ | 1 |
| 3 | $-1 + j$ | $-(I + Q) + j \cdot (I - Q)$ | $1/\sqrt{2}$ |
| 4 | $-1$ | $-I - j \cdot Q$ | 1 |
| 5 | $-1 - j$ | $(Q - I) - j \cdot (I + Q)$ | $1/\sqrt{2}$ |
| 6 | $-j$ | $Q - j \cdot I$ | 1 |
| 7 | $1 - j$ | $(I + Q) + j \cdot (Q - I)$ | $1/\sqrt{2}$ |

Another benefit of using approximately 135.417 kHz as the low intermediate frequency is that it enables the receiver system ADC bandwidth (e.g., of sigma-delta ADC 208) to be wider than a comparable direct conversion receiver (DCR) system. The wider bandwidth allows for the possibility of running the radio in either the DCR mode or the low IF mode.

The intermediate frequency of approximately 135.417 kHz is one-eighth of the sampling frequency used to sample the signal at the input to the low 1F mixer, which enables use of an eight-element complex table (Table 1) to implement the low IF mixer. In some embodiments, the use of a low IF that is one-fourth of the sampling frequency enables the use of a four-element real table. Thus, a low intermediate frequency of approximately 135.417 kHz based on one-eighth of the sampling frequency used to sample the signal at the input to the low IF mixer may be used, or some other frequency which is an integer divisor of the sampling frequency of the downsampled signal may be used.

The I and Q output signals of the digital demodulator 212 are provided to a digital processing module 214. The digital processing module 214 includes functionality to remove out-of-band energy and further sampling functionality to reduce complexity by downsampling the receive signal to a reduced sampling rate, thus reducing the rate at which processing operations are performed. For example, the digital processing module 214 may include a $4^{th}$ order infinite impulse response (IIR) low-pass filter (not shown) to attenuate the remaining adjacent channel interferers which lie within the fundamental Nyquist bandwidth (e.g., $2^{nd}$ adjacent interferers). The digital processing module 214 may also include a downsampler (not shown), as indicated above. The downsampler lowers the sampling frequency (e.g., to 541.7 kHz) to reduce computational complexity. The digital processing module 214 may also include a finite impulse response (FIR) low-pass filter (not shown) to remove any low frequency interference tones and provide close in-channel filtering, as well as to compensate for droop. A FIR low-pass filter can attenuate the low IF tone at 135.417 kHz at the same time as implementing the required channel filtering. A FIR low-pass filter may be designed with a null in the appropriate place of its amplitude response to assist in the removal of any remaining energy due to DC offset. A FIR low-pass filter may be programmable in some embodiments.

The digital signal output of the digital process element 214 is supplied via connection 261 to a digital control loop 265. The signal from the digital process element 214 is supplied to a digital scaling element 268 and to a receive signal strength indicator (RSSI) calculation element 267. An RSSI target element 264 receives a control signal from the digital control logic 190 and supplies a desired RSSI value via connection 271 to an adder 272. The output of the RSSI calculation element 267 is also supplied to the adder 272. The adder 272 provides the difference between the values from RSSI calculation element 267 and RSSI target element 264. The output of the adder 272 is supplied to an averaging LPF 276, the output of which on connection 277 is used to control the digital scaling element 268. By communicating over connection 252 with the memory 250/260, a complete buffered TDMA burst can be scaled by the digital scaling element 268. Alternatively, a conventional scaling loop can be implemented to scale the data in a manner not associated with a defined burst of data. In another embodiment (not shown), the output of the RSSI calculation element 267 can be supplied directly to the baseband subsystem 130 via connection 198 to provide the baseband subsystem 130 with an unscaled, absolute value representation of the RSSI signal.

The output of the digital scaling element 268 includes digital data and a digital gain signal and is supplied via connection 198 to the baseband subsystem 130. The digital control loop 265 sets the gain of the digital signal based on, in this embodiment, the difference between a target RSSI signal supplied to RSSI target element 264 via connection 191 from the digital control logic 190 (FIG. 1) and the RSSI of the received signal calculated by the RSSI calculation element 267. The digital control loop 265 ensures that the digital signal sent to the baseband subsystem 130 has an approximately constant root mean square (rms) voltage level. This allows the baseband subsystem 130 to inform the RF subsystem 144 as to the desired rms voltage level of the digital signal irrespective of the internal components of the RF subsystem 144.

In another embodiment, an entire TDMA burst is stored in the memory 250, or 260 and the RSSI calculation element 267 calculates the rms signal level of the TDMA burst data in the memory 250 or 260. As the data is read out of the memory 250 or 260, the digital scaling element 268 scales the level to the desired rms level before making the data available to the baseband subsystem 130. Further, the digital signal can be scaled at any point after the sigma-delta ADC 208 to achieve a constant rms level. Scaling the digital signal optimizes the performance of fixed point digital arithmetic performed by the baseband subsystem 130 and other digital processing elements. Providing a scaled rms signal from the RF subsystem 144 substantially eliminates the need for the baseband subsystem 130 to perform digital signal scaling.

In an alternative embodiment, scaling the digital signal prior to delivering the digital signal to the baseband subsystem 130 minimizes the amount of data that is sent to the baseband subsystem 130. The amount of data can be minimized by determining the maximum digital value of the signal and omitting the transfer of redundant sign bits. If the digital signal is buffered in the memory 250 or 260, then the maximum digital value can be easily determined. Removing redundant sign bits from the digital data prior to transferring the digital data to the baseband subsystem 130 reduces the amount of time required to transfer the data, thereby reducing latency in the receiver.

In an alternative embodiment, as the gain settings change as a result of the operation of the peak signal detector 255 and the AGC adjustment element 257, a corresponding change to the digital gain setting provided by the digital control loop 265 can be implemented. For example, if the analog gain is increased by 6 dB, the gain of the digital control loop 265 can be reduced by 6 dB, resulting in a net gain change of 0 dB. Synchronizing the gain change of the analog control loop 259 and the digital control loop 265 allows a reduction of the peak-to-peak burst signal amplitude measurement period to less than one burst interval. For this embodiment it might be preferred to apply the digital gain (or scaling) prior to any filtering in the digital domain, immediately at the output of the sigma-delta ADC 208, since in this case the digital signal processing blocks following the sigma-delta ADC 208 will not experience any overall change in signal level caused by the AGC function.

Figure 3:
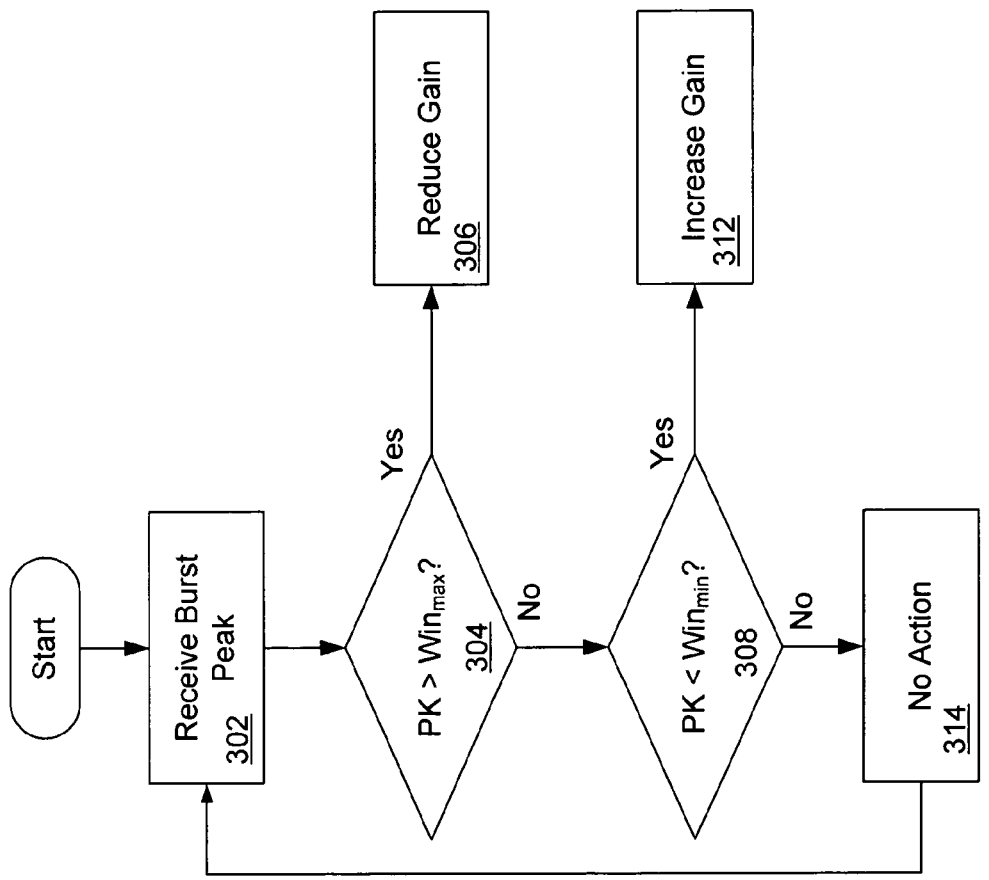
FIG. 3 is a flow diagram of an embodiment of the operation of an RF receiver with double loop integrated fast response AGC shown in FIG. 2.

FIG. 3 is a flowchart 300 describing the operation of the AGC adjustment element 257 of FIG. 2. In block 302 a signal representing peak burst amplitude is received by the AGC adjustment element 257. In block 304 it is determined whether the peak amplitude (PK) of the burst received in block 302 is greater than a maximum value ($Win_{max}$). If the peak amplitude of the burst is greater than a maximum value, then, in block 306 the AGC adjustment element 257 sends a signal via connection 258 to reduce the gain of the LNA 202 and the PGA 206.

If, in block 304, it is determined that the peak amplitude of the burst is not greater than a maximum value, then, in block 308 it is determined whether the peak amplitude of the burst received in block 302 is less than a minimum value($Win_{min}$). If the peak amplitude of the burst is less than a minimum value, then, in block 312 the AGC adjustment element 257 sends a signal via connection 258 to increase the gain of the LNA 202 and/or the PGA 206. Adjustments to the analog gain of the LNA 202 and the PGA 206 can be made using a fixed magnitude, (in dB), or a variable adjustment scheme. Further, the peak-to-peak measurement provided by the peak signal detector 255 can be digitally filtered to provide a mean-level that can be used as input to the AGC gain adjustment element 257.

If, in block 308 it is determined that the peak amplitude of the burst received in block 302 is not less than a minimum value, then the peak amplitude is between the minimum and maximum values and no action is taken. The process then returns to block 302.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

While various embodiments of the invention have been described, it will be apparent to those of ordinary skill in the art that many more embodiments and implementations are possible that are within the scope of this invention. Accordingly, the invention is not to be restricted except in light of the following claims and their equivalents.

What is claimed is:

1. A method for performing automatic gain control in a radio frequency (RF) receiver, comprising:

receiving an analog radio frequency signal, the analog radio frequency signal occurring during a defined time period;

downconverting the analog radio frequency signal to a downconverted analog signal;

determining, in an RF portion of the receiver, a peak signal level of the downconverted analog signal using a peak-to-peak amplitude hold detector;

determining whether the peak signal level falls within a predetermined range; and generating a gain control setting for at least one analog component based on whether the peak signal level falls within the predetermined range;

converting the downconverted analog signal to a digital signal;

buffering the digital signal over the defined time period;

estimating a measure of receiver impairment;

calculating a property of the digital signal;

applying a compensation factor in response to the measure of receiver impairment to the digital signal over the defined time interval;

comparing the property of the digital signal to a digital reference value;

scaling the digital signal;

providing a scaled digital signal including a digital gain setting to a baseband subsystem associated with the RF receiver; and synchronizing a change in the analog gain setting and the digital gain setting to such that a peak-to-peak burst signal amplitude measurement period is less than one burst interval.

2. The method of claim 1, wherein determining the peak signal level of the downconverted analog signal prior to converting the analog downconverted signal to a digital signal reduces the likelihood that than an analog-to-digital converter will saturate.

3. The method of claim 1, further comprising removing redundant sign bits from the digital signal prior to providing the digital signal to the baseband subsystem.

4. The method of claim 1, wherein the calculated property of the digital signal is a receive signal strength indicator (RSSI) signal and the calculated RSSI signal is provided to the baseband subsystem.

5. A radio frequency (RF) receiver device, comprising:

a receiver system that receives an analog radio frequency (RF) signal and downconverts the analog radio frequency signal to a downconverted analog signal, the receiver system further including:

a peak signal detector configured to determine a peak signal level of the downconverted analog signal; and an automatic gain control adjustment element configured to determine whether the peak signal level falls within a predetermined range, and configured to generate, in the RF receiver system, a gain control signal based on whether the peak signal level falls within the predetermined range;

an analog to digital converter configured to convert the downconverted analog signal into a digital signal;

an impairment correction module arranged to receive the digital signal, monitor the digital signal over a defined time period and apply a correction to the digital signal over the defined time interval; and a digital control loop configured to filter the digital signal, compare a property of the digital signal to a digital reference value, scale the digital signal, and provide the digital signal to a baseband subsystem associated with the RF receiver system, the digital control loop comprising, a receive signal strength indicator (RSSI) calculation element configured to generate an RSSI signal based on the digital signal;

an RSSI target element configured to generate a target RSSI signal;

an averaging filter configured to average a difference between the calculated RSSI signal and the target RSSI signal; and a digital scaling element configured to scale the digital signal for delivery to the baseband subsystem.

6. The device of claim 5, wherein the gain control signal controls the analog gain of at least one amplifier in the receiver system.

7. The device of claim 6, wherein the peak signal detector is a peak-to-peak hold detector.

8. The device of claim 5, wherein the peak signal detector and the AGC adjustment element form an analog AGC loop.

9. The device of claim 8, wherein a change of an analog gain setting by the AGC loop and a change in a digital gain setting by the digital control loop are synchronized.

10. The device of claim 9, wherein synchronizing the change of the analog gain setting and the digital gain setting reduces a peak-to-peak burst signal amplitude measurement period to less than one burst interval.

11. The device of claim 5, wherein redundant sign bits are removed from the digital signal prior to providing the digital signal to the baseband subsystem.

12. A portable transceiver having a radio frequency (RF) receiver device, comprising:

a receiver system that receives an analog radio frequency (RF) signal and downconverts the analog radio frequency signal to a downconverted analog signal, the receiver system further including:

a peak signal detector configured to determine a peak signal level of the downconverted analog signal;

an automatic gain control adjustment element configured to determine whether the peak signal level falls within a predetermined range, and configured to generate, in the RF receiver, a gain control signal based on whether the peak signal level falls within the predetermined range;

an analog to digital converter configured to convert the downconverted analog signal into a digital signal;

an impairment correction module arranged to receive the digital signal, monitor the digital signal over a defined time period and apply a correction to the digital signal over the defined time interval; and a digital control loop configured to compare the digital signal to a digital reference value, scale the digital signal, and provide the digital signal to a baseband subsystem associated with the RF receiver, wherein a change of an analog gain setting by an automatic gain control (AGC) loop and a change in a digital gain setting by the digital control loop are synchronized to reduce a peak-to-peak burst signal amplitude measurement period to less than one burst interval.

13. The portable transceiver of claim 12, further comprising a memory configured to buffer the downconverted signal prior to the digital signal being compared to a digital reference value, wherein the contents of the memory are scaled to provide the digital signal to a baseband subsystem associated with the RF receiver.

* * * * *